(12) United States Patent
Foti et al.

(10) Patent No.: US 11,943,678 B2
(45) Date of Patent: Mar. 26, 2024

(54) CONTROLLED HANDOVER FROM AN INCOMING ACCESS NETWORK TO A CELLULAR ACCESS NETWORK OF A VISITED NETWORK WHILE IN ROAMING

(71) Applicant: Telefonaktiebolaget LM Ericsson (publ), Stockholm (SE)

(72) Inventors: George Foti, Dollard des Ormeaux (CA); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 322 days.

(21) Appl. No.: 17/280,261

(22) PCT Filed: Sep. 11, 2019

(86) PCT No.: PCT/IB2019/057672
§ 371 (c)(1),
(2) Date: Mar. 26, 2021

(87) PCT Pub. No.: WO2020/065432
PCT Pub. Date: Apr. 2, 2020

(65) Prior Publication Data
US 2022/0053401 A1 Feb. 17, 2022

Related U.S. Application Data

(60) Provisional application No. 62/754,922, filed on Nov. 2, 2018, provisional application No. 62/736,792, filed on Sep. 26, 2018.

(51) Int. Cl.
*H04W 36/32* (2009.01)
*H04W 8/12* (2009.01)
(Continued)

(52) U.S. Cl.
CPC ............. *H04W 36/32* (2013.01); *H04W 8/12* (2013.01); *H04W 36/0022* (2013.01); *H04W 36/14* (2013.01); *H04W 84/12* (2013.01)

(58) Field of Classification Search
CPC ... H04W 36/32; H04W 8/12; H04W 36/0022; H04W 36/14; H04W 84/12
(Continued)

(56) References Cited

U.S. PATENT DOCUMENTS

| | | | |
|---|---|---|---|
| 5,063,591 A * | 11/1991 | Jodoin | H04M 15/16 379/115.01 |
| 2015/0358898 A1* | 12/2015 | Lair | H04W 48/12 455/434 |
| 2018/0352483 A1* | 12/2018 | Youn | H04W 36/00 |

FOREIGN PATENT DOCUMENTS

WO 2018133949 A1 7/2018

OTHER PUBLICATIONS

Author Unknown, "Technical Specification Group Services and System Aspects; Procedures for the 5G System; Stage 2 (Release 15)," Technical Specification 23.502, Version 15.3.0, Sep. 2018, 3GPP Organizational Partners, 330 pages.
(Continued)

*Primary Examiner* — Michael Y Mapa
(74) *Attorney, Agent, or Firm* — Withrow & Terranova, PLLC

(57) ABSTRACT

Systems and methods are disclosed herein for performing a controlled handover of a wireless device from an incoming access network to a cellular access network of a visited cellular network. In some embodiments, a method for handover of a wireless device from an incoming access network to a cellular access network of a visited cellular network while in roaming comprises, at the wireless device, sending a message to a core network of the visited cellular network. The message is related to a handover of the wireless device
(Continued)

from the incoming access network to the cellular access network of the visited cellular network and comprises an incoming access indication. The incoming access indication is an indication of the incoming access network. The method further comprises, at the core network node, receiving the message and making a decision for the handover based on the incoming access indication.

24 Claims, 11 Drawing Sheets

(51) Int. Cl.
*H04W 36/00* (2009.01)
*H04W 36/14* (2009.01)
*H04W 84/12* (2009.01)

(58) Field of Classification Search
USPC .............................. 370/331; 455/432.1–445
See application file for complete search history.

(56) References Cited

OTHER PUBLICATIONS

LG Electronics, et al., "S2-175787: TS 23.502: Applicability of handover between 3GPP and N3GPP," 3GPP SA WG2 Meeting #122bis, Aug. 21-25, 2017, Sophia Antipolis, France, 12 pages.
Examination Report for European Patent Application No. 19787428.2, dated Jan. 31, 2023, 7 pages.
Author Unknown, "Technical Specification Group Services and System Aspects; General Packet Radio Service (GPRS) enhancements for Evolved Universal Terrestrial Radio Access Network (E-UTRAN) access (Release 15)," Technical Specification 23.401, Version 15.5.0, 3GPP Organizational Partners, Sep. 2018, 410 pages.
Author Unknown, "Technical Specification Group Services and System Aspects; Architecture enhancements for non-3GPP accesses (Release 15)," Technical Specification 23.402, Version 15.3.0, 3GPP Organizational Partners, Mar. 2018, 314 pages.
Author Unknown, "Technical Specification Group Services and System Aspects; System Architecture for the 5G System; Stage 2 (Release 15)," Technical Specification 23.501, Version 15.2.0, 3GPP Organizational Partners, Jun. 2018, 217 pages.
Author Unknown, "Technical Specification Group Services and System Aspects; Procedures for the 5G System; Stage 2 (Release 15)," Technical Specification 23.502, Version 15.2.0, 3GPP Organizational Partners, Jun. 2018, 308 pages.
Author Unknown, "Technical Specification Group Core Network and Terminals; Access to the 3GPP Evolved Packet Core (EPC) via non-3GPP access networks; Stage 3 (Release 15), " Technical Specification 24.302, Version 15.3.0, 3GPP Organizational Partners, Jun. 2018, 174 pages.
GSMA, "S5-195051: LS to SA2 and SA5 on VoWiFi—VOLTE handover," Third Generation Partnership Project (3GPP), TSG-SA5 Meeting #126, Aug. 19-23, 2019, 2 pages, Bruges, Belgium.
LG Electronics, "S2-178614: Discussion on Hanover between 3GPP and N3GPP via different PLMN," Third Generation Partnership Project (3GPP), SA WG 2 Meeting #124, Nov. 27-Dec. 1, 2017, 15 pages, Reno, USA.
International Search Report and Written Opinion for International Patent Application No. PCT/IB2019/057672, dated Jan. 3, 2020, 17 pages.

\* cited by examiner

CONTROLLED HANDOVER FROM AN INCOMING ACCESS NETWORK TO A CELLULAR ACCESS NETWORK OF A VISITED NETWORK WHILE IN ROAMING

RELATED APPLICATIONS

This application is a 35 U.S.C. § 371 national phase filing of International Application No. PCT/IB2019/057672, filed Sep. 11, 2019, which claims the benefit of provisional patent application Ser. No. 62/736,792, filed Sep. 26, 2018, and provisional patent application Ser. No. 62/754,922, filed Nov. 2, 2018, the disclosures of which are hereby incorporated herein by reference in their entireties.

TECHNICAL FIELD

The present disclosure relates to handover of a session from an initial access network (e.g., a Non-Third Generation Partnership Project (N3GPP) network such as, e.g., a WiFi network) to a cellular access network (e.g., a 3GPP network).

BACKGROUND

Voice over WiFi (VoWiFi) is a technology that is integrated with the Third Generation Partnership Project (3GPP) core network (e.g., the Evolved Packet Core (EPC) for Long Term Evolution (LTE) or the Fifth Generation Core (5GC) for Fifth Generation (5G) New Radio (NR)). VoWiFi is a complementary technology for, e.g., Voice over LTE (VoLTE) that utilizes Internet Protocol (IP) Multimedia Subsystem (IMS) technology to provide packet voice service that is delivered over WiFi using IP. In 3GPP terminology, VoWiFi is one type of Non-3GPP (N3GPP) access that is integrated with the 3GPP core network.

VoWiFi is a very popular service, especially while roaming, since it enables users to reduce their roaming charges and, in some cases, eliminate them entirely if they are calling to their home network. Indeed, calling to their home network via VoWiFi for roaming subscribers is one main use case to avoid roaming charges, if these are in place, of course.

Typically, in a VoWiFi session, the User Equipment (UE) initiates a handover to a 3GPP access network when WiFi coverage is diminished to the point of losing the session (or any other trigger by which the UE decides to perform a handover). Currently, the Home Public Mobile Network (HPMN) can configure the UE with information as to whether handover to 3GPP is allowed or not allowed while roaming.

The current configuration by the HPMN in the UE does not consider whether the HPMN has any roaming agreements with the Visited Public Mobile Network (VPMN). In addition, in VoWiFi initiated sessions while roaming, the UE is often connected to an evolved Packet Data Gateway (ePDG) at the UE's home network; hence, it is not possible for the UE to receive any information regarding the VPMN including whether or not roaming is supported in the VPMN, whether or not Voice over IMS (VoIMS) is allowed or not allowed in the VPMN, and whether or not VoIMS supported in the VPMN.

Hence, a UE initiated session while roaming does not consider anything related to the VPMN prior to initiating the session over WiFi. The HPMN configuration in the UE controlling handover also does not consider anything about the VPMN. Importantly, the UE does not check whether IMS voice is supported at all in the VPMN or whether IMS voice is supported in the VPMN for inbound roamers prior to initiating the attach procedure with handover indication. In certain cases, it may not be possible to check whether IMS voice is supported at all in the VPMN since the attach procedure with handover is indeed the first interaction with the VPMN. This leaves everything under control of the HPMN regarding a VoWiFi session. Operators are also concerned about UEs not respecting their configuration and UEs not being implemented correctly.

Hence, when the UE initiates handover to 3GPP, the VPMN receiving an initial attachment request with a handover indication may or may not continue the session after handover, irrespective of whether the VPMN supports VoIMS or not or has a roaming agreement with the home domain of the inbound roamer.

However, there is no possibility today to gracefully reject a handover at initial attachment. The handover rejection by the VPMN is considered as a mobility failure, with impact on Key Performance Indicators (KPIs), because there is no standard support for a graceful handover rejection in association with initial attachment. To enable such a graceful handover rejection, the VPMN must be able to distinguish a failed handover due to bad network conditions from a graceful handover rejection via some means. Note that rejecting the attach with a handover indication does not mean that the call is dropped; the call can continue on WiFi (i.e., Wireless Local Area Network (WLAN)), possibly with an indication to the user to preferably stay in WiFi coverage to avoid call drops.

Furthermore, if the VPMN can continue the session, it is not possible to charge the call as a roaming session if the call started as a non-roaming session on WLAN (ePDG and hence Proxy Call Session Control Function (P-CSCF) in HPMN).

Certain aspects of the present disclosure and their embodiments may provide solutions to the aforementioned or other challenges. The present disclosure provides systems and methods that enable the VPMN to distinguish a graceful handover rejection from rejections resulting from bad network conditions and, as such, KPIs are properly accounted for. In addition, it enables the VPMN to charge the session as a roaming session.

There are, proposed herein, various embodiments which address one or more of the issues disclosed herein.

Certain embodiments may provide one or more of the following technical advantage(s). The embodiments disclosed herein propose a simple way to enable a VPMN to control handover from WLAN regardless of whether the core network is EPC, 5G EPC, or 5GC.

SUMMARY

Systems and methods are disclosed herein for performing a controlled handover of a wireless device from an incoming access network to a cellular access network of a visited cellular network. In some embodiments, a method for handover of a wireless device from an incoming access network to a cellular access network of a visited cellular network while in roaming comprises, at the wireless device, sending a message to a core network of the visited cellular network. The message is related to a handover of the wireless device from the incoming access network to the cellular access network of the visited cellular network. Further, the message comprises an incoming access indication, wherein the incoming access indication is an indication of the incoming access network from which the handover of the wireless device is desired. The method further comprises, at the core network node, receiving the message and making a decision as to whether to accept or reject the handover based on the incoming access indication. In this manner, a controlled handover is provided in which the wireless device may be gracefully rejected if handover is requested from a non-allowed incoming access network (e.g., a non-allowed incoming access network type).

Embodiments of a method performed by a wireless device and corresponding embodiments of a wireless device are disclosed. In some embodiments, a method performed by a wireless device to perform a handover from an incoming access network to a cellular access network of a visited cellular network while in roaming comprises sending a message to a core network of the visited cellular network. The message is related to a handover of the wireless device from the incoming access network to the cellular access network of the visited cellular network. Further, the message comprises an incoming access indication, wherein the incoming access indication is an indication of the incoming access network from which the handover of the wireless device is desired.

In some embodiments, the message is a Non-Access Stratum (NAS) message, and the NAS message comprises the incoming access indication. In some other embodiments, the message is a NAS message, and the NAS message comprises the incoming access indication and a handover indication, where the handover indication is an indication that the initial attach request is for a handover from a non-cellular access network. In some embodiments, the NAS message is an initial attach request. Further, in some embodiments, a Packet Data Network (PDN) connection request is embedded within the initial attach request, and the incoming access indication is included in the PDN connection request embedded within the initial attach request.

In some embodiments, the message is a Protocol Data Unit (PDU) session establishment request.

In some embodiments, the incoming access indication is an indication of a network type of the incoming access network.

In some embodiments, the incoming access network is a non-cellular access network. In some embodiments, the incoming access network is a Wireless Local Area Network (WLAN) access network.

In some embodiments, the method further comprises receiving, from the core network, a second message indicating handover failure based on the access network type of the incoming access network.

In some embodiments, a wireless device for performing a handover from an incoming access network to a cellular access network of a visited cellular network while in roaming is adapted to send a message to a core network of a visited cellular network. The message is related to a handover of the wireless device from the incoming access network to the cellular access network of the visited cellular network. Further, the message comprises an incoming access indication, wherein the incoming access indication is an indication of the incoming access network from which the handover of the wireless device is desired.

In some embodiments, the wireless device comprises a radio interface and processing circuitry operable to cause the wireless device to send the message to the core network of the visited cellular network.

Embodiments of a method performed by a core network node and corresponding embodiments of a core network node are also disclosed. In some embodiments, a method performed by a core network node in a visited cellular network of a wireless device to accept or reject handover of the wireless device from an incoming access network to a cellular access network of the visited cellular network while the wireless device is in roaming comprises receiving a message that is related to a handover of the wireless device from the incoming access network to the cellular access network of the visited cellular network. The message comprises an incoming access indication wherein the incoming access indication is an indication of the incoming access network from which the handover of the wireless device is desired. The method further comprises making a decision as to whether to accept or reject the handover based on the incoming access indication.

In some embodiments, the message is a NAS message, and the NAS message comprises the incoming access indication. In some other embodiments, the message is a NAS message, and the NAS message comprises the incoming access indication and a handover indication, wherein the handover indication is an indication that the initial attach request is for a handover from a non-cellular access network. In some embodiments, the NAS message is an initial attach request. In some embodiments, a PDN connection request is embedded within the initial attach request, and the incoming access indication is included in the PDN connection request embedded within the initial attach request.

In some embodiments, the message is a PDU session establishment request from the wireless device.

In some embodiments, the incoming access indication is an indication of a network type of the incoming access network.

In some embodiments, the incoming access network is a non-cellular access network. In some embodiments, the incoming access network is a WLAN access network.

In some embodiments, making the decision as to whether to accept or reject the handover based on the incoming access indication comprises deciding to accept the handover based on the incoming access information, and the method further comprises, upon successful handover, storing the incoming access indication in one or more associated charging data records.

In some embodiments, making the decision as to whether to accept or reject the handover based on the incoming access indication comprises deciding to reject the handover based on the incoming access information, and the method further comprises, upon deciding to reject the handover, rejecting the handover using a code that indicates that the handover failed due to a non-allowed incoming access network. In some embodiments, rejecting the handover comprises sending a message to the wireless device that indicates that the handover is rejected, the message comprising the code that indicates that the handover failed due to a non-allowed incoming access network.

In some embodiments, making the decision as to whether to accept or reject the handover based on the incoming access indication comprises making the decision as to whether to accept or reject the handover based on the incoming access indication and one or more additional criteria. In some embodiments, the one or more additional criteria comprise an indication of one of a PDN or a service for which the wireless device is requesting access. In some embodiments, the indication comprises an Access Point Name (APN) associated with the handover.

In some embodiments, a core network node for a visited cellular network of a wireless device for accepting or rejecting handover of the wireless device from an incoming access network to a cellular access network of the visited cellular network while the wireless device is in roaming is adapted to receive a message that is related to a handover of the wireless device from the incoming access network to the cellular access network of the visited cellular network. The message comprises an incoming access indication, wherein the incoming access indication is an indication of the incoming access network from which the handover of the wireless device is desired. The core network node is further adapted to make a decision as to whether to accept or reject the handover based on the incoming access indication.

In some embodiments, the core network node comprises processing circuitry operable to cause the core network node to receive the message and make the decision as to whether to accept or reject the handover based on the incoming access indication.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
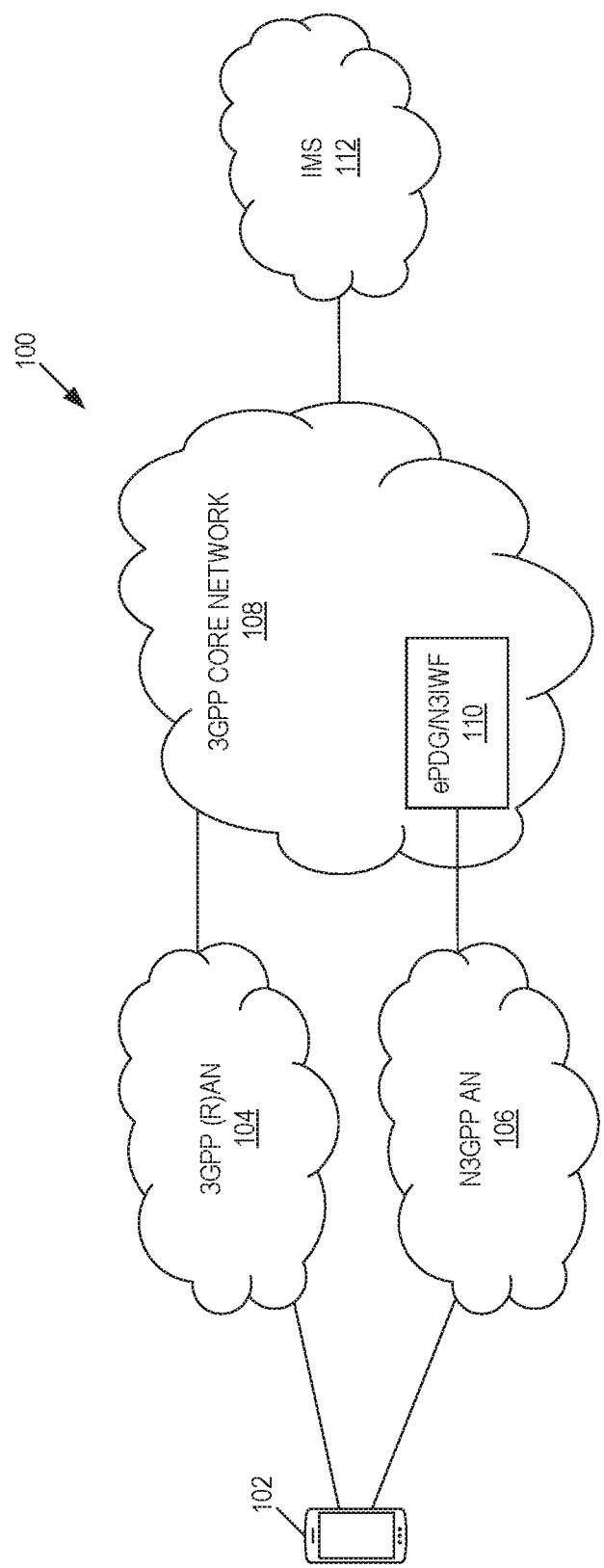
FIG. 1 illustrates one example of a wireless communication system in which a User Equipment (UE) has the capability to utilize both a cellular access network, which is shown as a Third Generation Partnership Project (3GPP) (Radio) Access Network ((R)AN) and a Wireless Local Area Network (WLAN), which is shown as a Non-3GPP (N3GPP) AN.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network (PDN) Gateway (P-GW), a Service Capability Exposure Function (SCEF), Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Systems and methods are disclosed herein for performing a controlled handover of a wireless device from an incoming access network to a cellular access network of a visited cellular network. In other words, systems and methods are disclosed herein for control of handover of a wireless device from an incoming access network to a cellular access network of a visited cellular network such that the visited network may gracefully reject handover from a non-allowed incoming access network (e.g., a non-allowed incoming access network type).

The present disclosure provides systems and methods that enable a Visited Public Mobile Network (VPMN) to distinguish a graceful handover rejection from rejections resulting from bad network conditions and, as such, Key Performance Indicators (KPIs) are properly accounted for and unwanted roaming call cases are prevented. In addition, in some embodiments, the VPMN is enabled to charge the session as a roaming session.

In this regard, FIG. 1 illustrates one example of a wireless communication system 100 in which a UE 102 has the capability to utilize both a cellular access network, which is shown as a 3GPP (Radio) Access Network ((R)AN) 104, and a Wireless Local Area Network (WLAN) access network, which is shown as a Non-3GPP (N3GPP) AN 106. The 3GPP (R)AN 104 may be a Fourth Generation (4G) RAN (e.g., a LTE or LTE-Advanced RAN, including a number of base stations which are referred to as eNBs) or a 5G RAN (e.g., a NR RAN, including a number of base stations which are referred to as gNBs). The 3GPP (R)AN 104 is connected to a core network, which is shown as a 3GPP core network 108 (e.g., an Evolved Packet Core (EPC) or 5G Core (5GC)). The N3GPP AN 106 is connected to the 3GPP core network 108 via a gateway or interworking function, which is shown as an evolved Packet Data Gateway (ePDG)/N3GPP Inter-Working Function (N3IWF) 110. Notably, the term "ePDG" is used for 4G, and the term "N3IWF" is used for 5G. The 3GPP core network 108 is connected to an Internet Protocol (IP) Multimedia Subsystem (IMS) 112, as will be appreciated by one of skill in the art.

Note that while many of the specific examples described herein relate to handover from a WLAN access network (i.e., the incoming access network) to a 3GPP access network, the present disclosure is not limited thereto. The incoming access network is not limited to being a WLAN access network. Other types of incoming access networks may be used. Embodiments of the present disclosure apply to any handover where it is performed through a registration or attach procedure. For NR and LTE, if there is no N26 interface and the NG RAN and LTE access network also do not support Xn or X2, embodiments of the present disclosure could apply as well if the UE has to "handover" when moving from 5G RAN to LTE or vice versa.

Figure 2:
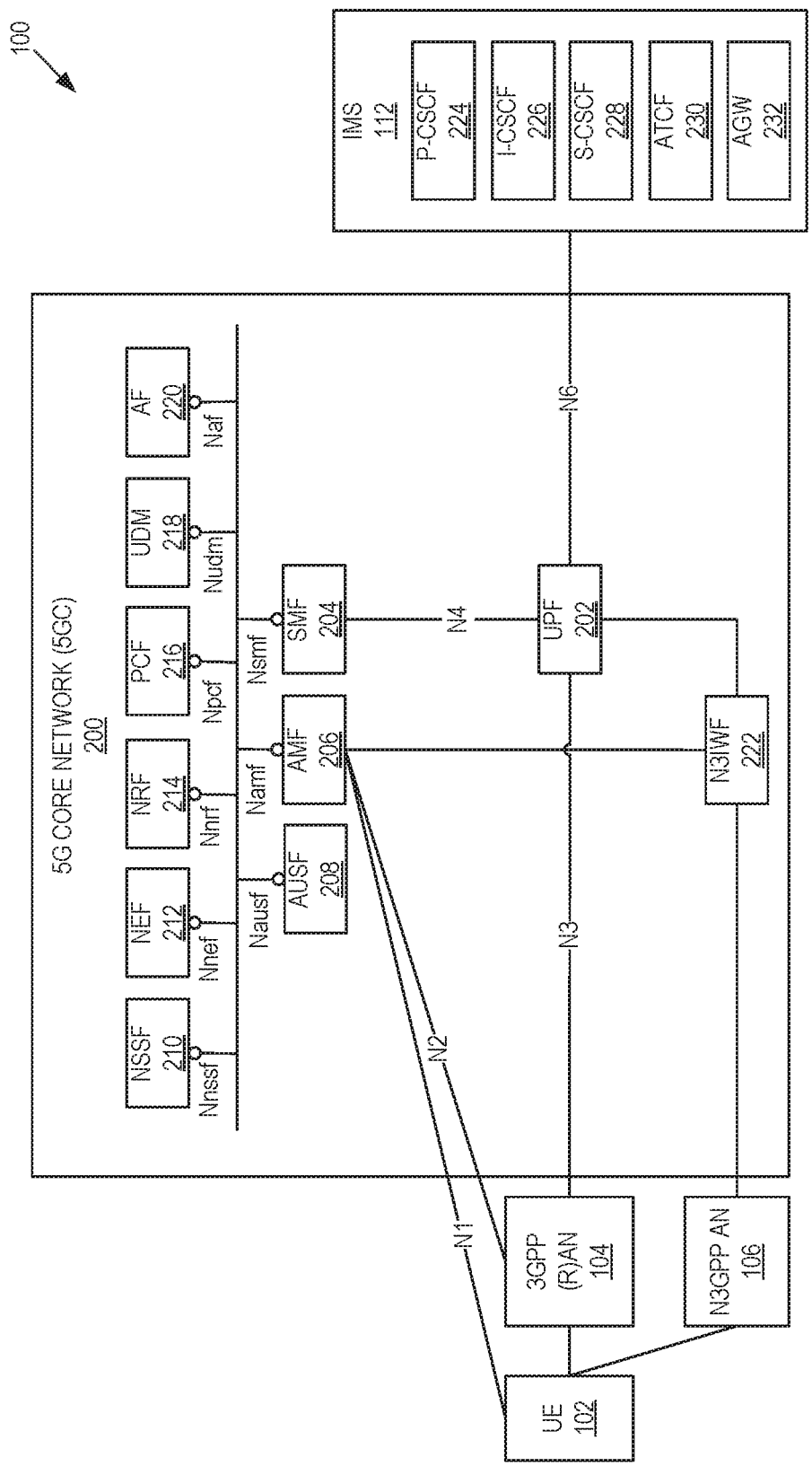
FIG. 2 illustrates an example of the wireless communication system of FIG. 1 in which the 3GPP core network is a Fifth Generation Core (5GC)
Figure 3:
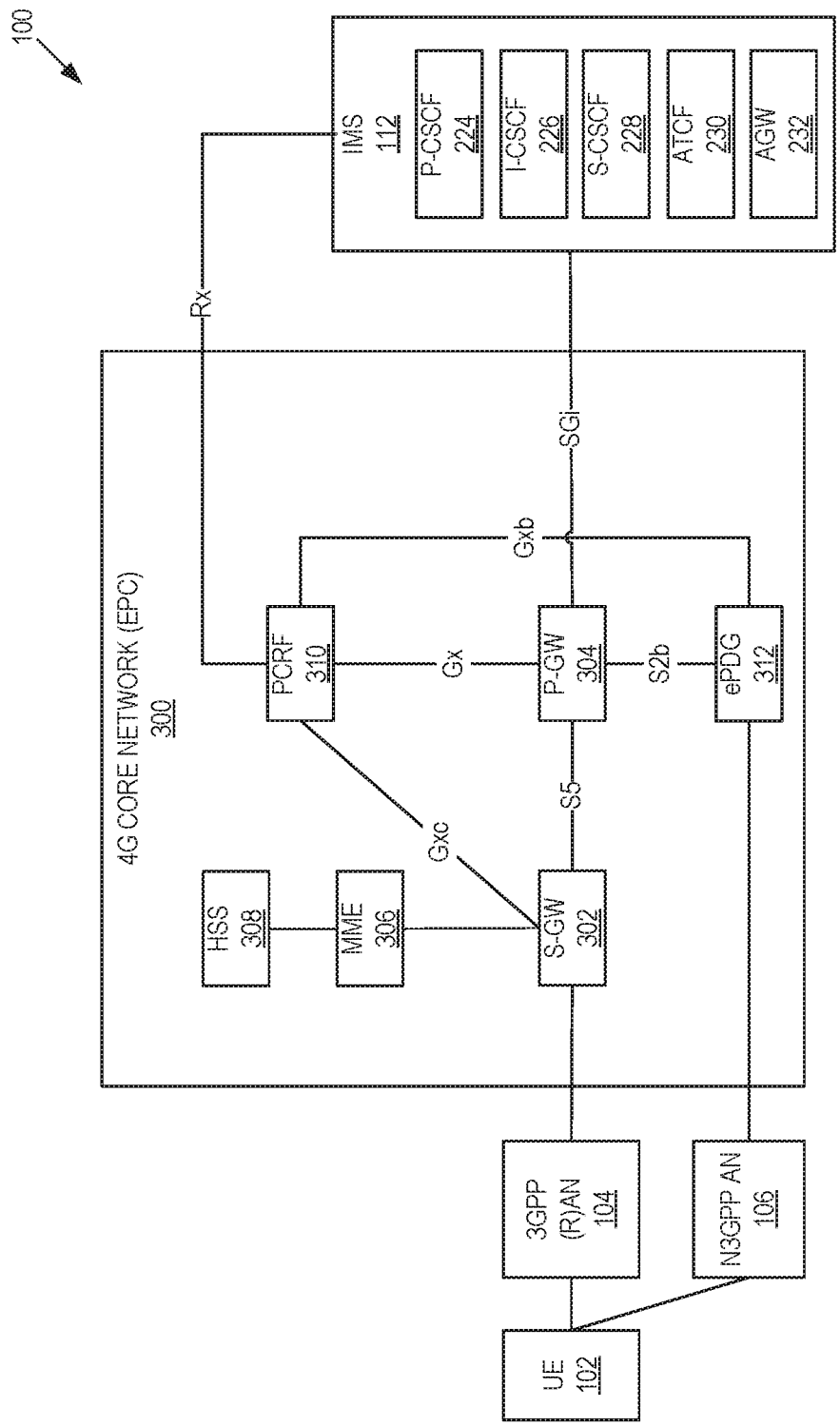
FIG. 3 illustrates an example of the wireless communication system of FIG. 1 in which the 3GPP core network is an Evolved Packet Core (EPC)

FIGS. 2 and 3 illustrate two specific examples of the wireless communication system 100 of FIG. 1 in which the 3GPP core network 108 is a 5GC 200 in FIG. 2 and an EPC 300 in FIG. 3.

Looking first at FIG. 2, as will be appreciated by one of skill in the art, the 5GC 200 includes a number of Network Functions (NFs) connected by service-based interfaces in the control plane. An NF may be implemented either as a network element on a dedicated hardware, as a software instance running on a dedicated hardware, or as a virtualized function instantiated on an appropriate platform, e.g., a cloud infrastructure. As illustrated, the 5GC 200 includes a UPF 202, an SMF 204, an AMF 206, an AUSF 208, a NSSF 210, a NEF 212, a NRF 214, a PCF 216, a UDM 218, and an Application Function (AF) 220.

Note that while FIG. 2 illustrates the 5GC 200 as a service-based architecture, a reference point representation may alternatively be used. Reference point representations of the 5G network architecture are used to develop detailed call flows in the normative standardization.

The 5GC 200 aims at separating a user plane and a control plane. The user plane carries user traffic while the control plane carries signaling in the network. In FIG. 2, the UPF 202 is in the user plane and all other NFs, i.e., the SMF 204, AMF 206, AUSF 208, NSSF 210, NEF 212, NRF 214, PCF 216, UDM 218, and AF 220, are in the control plane. Separating the user and control planes guarantees each plane resource to be scaled independently. It also allows UPFs 202 to be deployed separately from control plane functions in a distributed fashion. In this architecture, the UPFs 202 may be deployed very close to UEs 102 to shorten the Round Trip Time (RU) between the UEs 102 and the data network for some applications requiring low latency.

The core 5G network architecture is composed of modularized functions. For example, the AMF 206 and SMF 204 are independent functions in the control plane. Separating the AMF 206 and SMF 204 allows for independent evolution and scaling. Other control plane functions like the PCF 216 and AUSF 208 can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as a service so that its reuse is possible. This service enables support for modularity. The user plane supports interactions such as forwarding operations between different UPFs 202.

The service(s) that an NF provides to other authorized NFs can be exposed to the authorized NFs through the service-based interface. In FIG. 2, the service-based interfaces are indicated by the letter "N" followed by the name of the NF (e.g., Namf for the service based interface of the AMF 206 and Nsmf for the service based interface of the SMF 204, etc.).

Some properties of the NFs shown in FIG. 2 may be described in the following manner; however, the interested reader can find additional details in 3GPP Technical Specification (TS) 23.501. The AMF 206 provides UE-based authentication, authorization, mobility management, etc. A UE 102 even using multiple access technologies is basically connected to a single AMF 206 because the AMF 206 is independent of the access technologies. The SMF 204 is responsible for session management and allocates IP addresses to UEs 102. It also selects and controls the UPF 202 for data transfer. If a UE 102 has multiple sessions, different SMFs 204 may be allocated to each session to manage them individually and possibly provide different functionalities per session. The AF 220 provides information on the packet flow to the PCF 216 responsible for policy control in order to support Quality of Service (QoS). Based on the information, the PCF 216 determines policies about mobility and session management to make the AMF 206 and SMF 204 operate properly. The AUSF 208 supports an authentication function for the UEs 102 or similar and thus stores data for authentication of the UEs 102 or similar while the UDM 218 stores subscription data of the UE 102.

In addition to the NFs described above, the 5GC 200 includes a N3IWF 222 that provides an interface between the N3GPP AN 106 and the 5GC 200. While not necessary for understanding the present disclosure, for additional details regarding the N3IWF 222, the interested reader is directed to 3GPP TS 23.501 and 23.502.

As will be understood by those of skill in the art, the IMS 112 includes various IMS entities such as, for example, a Proxy Call Session Control Function (P-CSCF) 224, an Interrogating Call Session Control Function (I-CSCF) 226, a Serving Call Session Control Function (S-CSCF) 228, an Access Transfer Control Function (ATCF) 230, and an Access Gateway (AGW) 232. The operational details of the P-CSCF 224, the I-CSCF 226, the S-CSCF 228, the ATCF 230, and the AGW 232 are well known to those of skill in the art and are therefore not described here.

Now turning to FIG. 3, as will be appreciated by one of skill in the art, the EPC 300 includes a number of core network entities such as, e.g., a Serving Gateway (S-GW) 302, a P-GW 304, an MME 306, a HSS 308, and a Policy and Charging Rules Function (PCRF) 310. The operational details of the S-GW 302, the P-GW 304, the MME 306, the HSS 308, and the PCRF 310 are well known to those of skill in the art and therefore are not repeated here.

In addition, the EPC 300 includes an ePDG 312 that provides an interface between the EPC 300 and the N3GPP AN 106. While not necessary for understanding the present disclosure, for additional details regarding the ePDG 312, the interested reader is directed to 3GPP TS 23.402.

Now, turning to embodiments of the present disclosure. In a first embodiment, a UE (e.g., a UE 102) includes an indication of the incoming access network (e.g., an indication of the incoming access network type as, e.g., a WLAN access network) during attachment (with handover indication) or Protocol Data Unit (PDU) session establishment (e.g., in addition to an handover indication indicating whether the handover is from a N3GPP or 3GPP access network) with the core network, depending on the case. This allows the network to decide whether to accept or reject the handover based on the incoming access network. In some embodiments, the network allows the attach (with handover indication) only if the UE provides the indication of the incoming access network such that attach (with handover indication) from an unsupportive UE will be always rejected. The supportive UE may provide the indication of the incoming access network only in case the procedure is for the purpose of handover.

Figure 4:
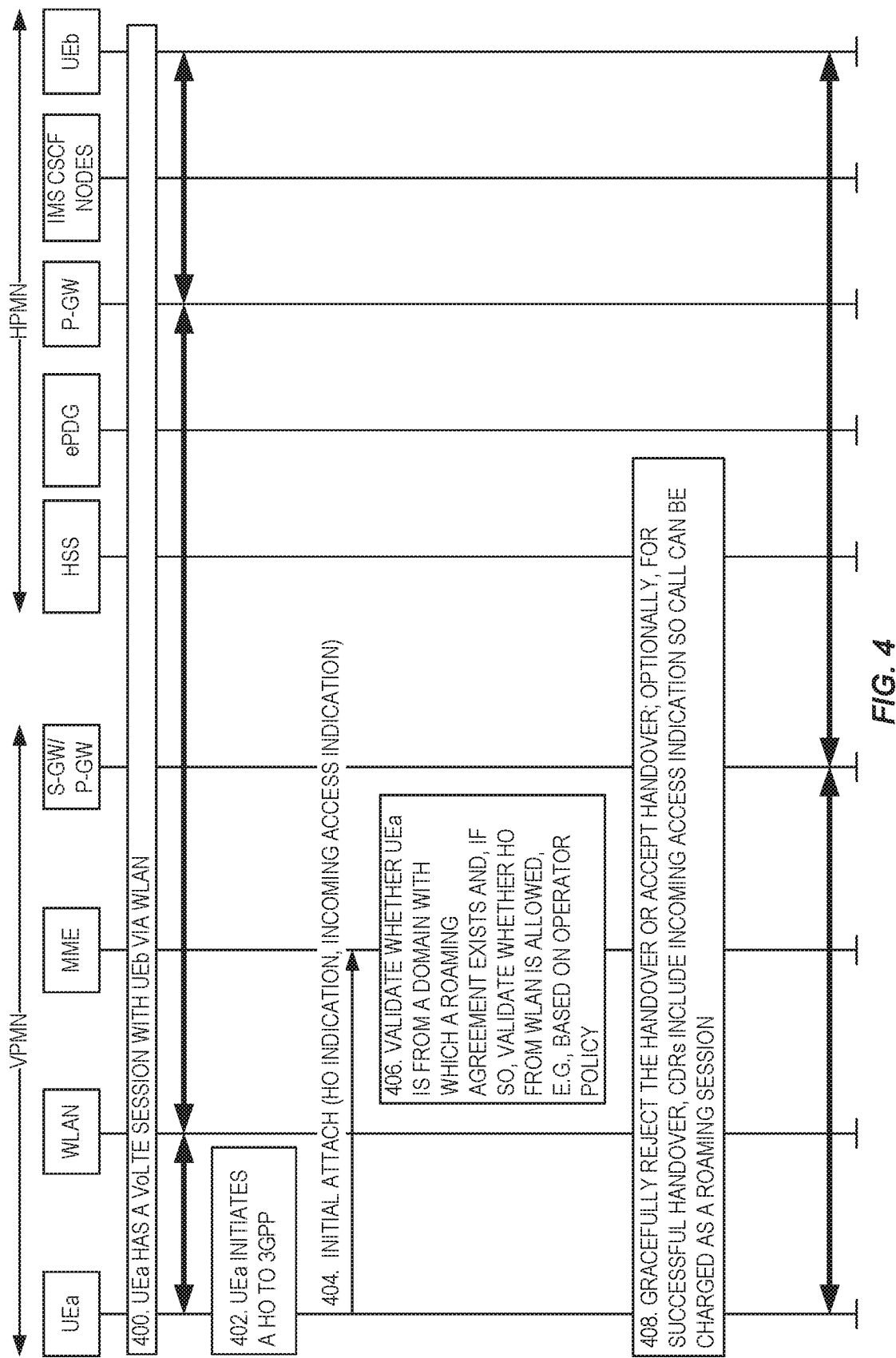
FIG. 4 illustrates one example implementation of at least some aspects of a first embodiment of the present disclosure in which a controlled handover of a UE is provided from an incoming access network (e.g., a WLAN) to a cellular radio access network (3GPP RAN) of a visited cellular network while the UE is in roaming.

FIG. 4 illustrates one example implementation of at least some aspects of the first embodiment of the present disclosure. Note that while this example uses EPC as the core network, the same principle applies to a 5GC, regardless of the handover target being a 5GC or EPC.

The steps illustrated in FIG. 4 are as follows.

In step 400, UEa while roaming attaches to a WLAN, establishes a Virtual Private Network (VPN) with the Home Public Mobile Network (HPMN), then establishes a Voice over LTE (VoLTE) session with UEb.

In step 402, UEa decides to handover the session to 3GPP access, which can be EPC or 5GC. In this example, it is assumed EPC.

In step 404, UEa starts an initial attach for handover purposes by sending an initial attach request. In this example, the initial attach request includes a handover (HO) indication that that initial attach request is for a handover. This is currently described in 3GPP TS 23.401 in the initial attach procedure and 3GPP TS 23.502, where the HO indication is mandatory for handover from N3GPP access to 3GPP access. In 3GPP TS 23.502, the HO indication is also used in case of interworking with N26 for mobility between 3GPP accesses. In this embodiment, in addition to the HO indication, the initial attach request includes an indication (referred to herein as an incoming access indication) of the incoming access network from which the handover is performed. In some embodiments, the incoming access indication is an indication of a network type of the incoming access network. In this example, the incoming access network is a WLAN and, as such, the incoming access indication is an indication that the incoming access network is a WLAN.

Note that while the present disclosure describes the HO indication and, in some embodiments, the incoming access indication as being included within the initial attach request (or some other message such as a PDN connection establishment request), it should be understood that the HO indication and, when applicable, the incoming access indication can be more generally understood as being included within a Non-Access Stratum (NAS) message (e.g., an initial attach request in which the HO indication and the incoming access indication are included in a PDN connection request embedded within the initial attach request).

Note that, in order to maintain backward compatibility, if the initial attach request in step 404 includes both the HO indication and the incoming access indication, then the HO indication in the initial attach request is interpreted as a handover of UEa from an incoming access network of the type indicated by the incoming access indication. Otherwise, if the initial attach request includes the HO indication but not an incoming access indication, then the HO indication is interpreted as an indication that the initial attach request is for a handover of UEa from WLAN to 3GPP access (i.e., the current meaning of the HO indication).

In step 406, upon receiving the initial attach request from UEa, the MME validates whether UEa is from a domain with which a roaming agreement exists. If a roaming agreement exists, the MME further validates whether the handover from the particular (type of) access network indicated by the incoming access indication (which in this example is WLAN) is allowed, e.g., based on operator policy, i.e., if the handover from the incoming domain/access network is allowed. If handover is allowed, then, in this example, the MME makes a decision to allow the handover. Otherwise, the MME makes a decision to reject the handover.

Note that while in this example, the MME decides whether to allow or reject the handover based on the incoming access indication, the present disclosure is not limited thereto. The decision as to whether to allow or reject the handover may be made by any suitable entity in the VPMN. Further, whether the decision is made by the MME or some other entity in the VPMN, the decision is made based on the incoming access indication and, optionally, one or more additional criteria (e.g., Access Point Name (APN)) associated with the handover (e.g., the APN provided by UEa during PDN connection establishment during the handover, or whether the VPMN supports Voice over IMS (VoIMS)).

In step 408, if the VPMN decides to reject the handover, the VPMN (e.g., the MME) rejects the handover gracefully, e.g., rejects the attachment with a special code that indicates that the rejection is due to a "bad" incoming access network (type), e.g., such that this failed attachment/handover is not included in the KPIs. If the VPMN decides to allow the handover, then the handover is completed, e.g., in the conventional manner. However, in some embodiments, if handover is allowed, the VPMN (e.g., the MME) includes the incoming access indication in generated Charging Data Records (CDRs) so the session can be charged as a roaming session, given that it started as a non-roaming session over WLAN.

In a second embodiment of the present disclosure, the UE stores access information (i.e., information regarding the access network such as, e.g., an indication of the access network type) that the UE is currently using. Then, during a handover, the core network retrieves the incoming access indication from the UE.

Note that while FIG. 4 illustrates one example of including the incoming access indication in the initial attach request for the handover, the present disclosure is not limited thereto. In some other embodiments, the incoming access indication (e.g., and the HO indication) are included in a PDU session establishment request from UEa during PDU session establishment for the handover.

Figure 5:
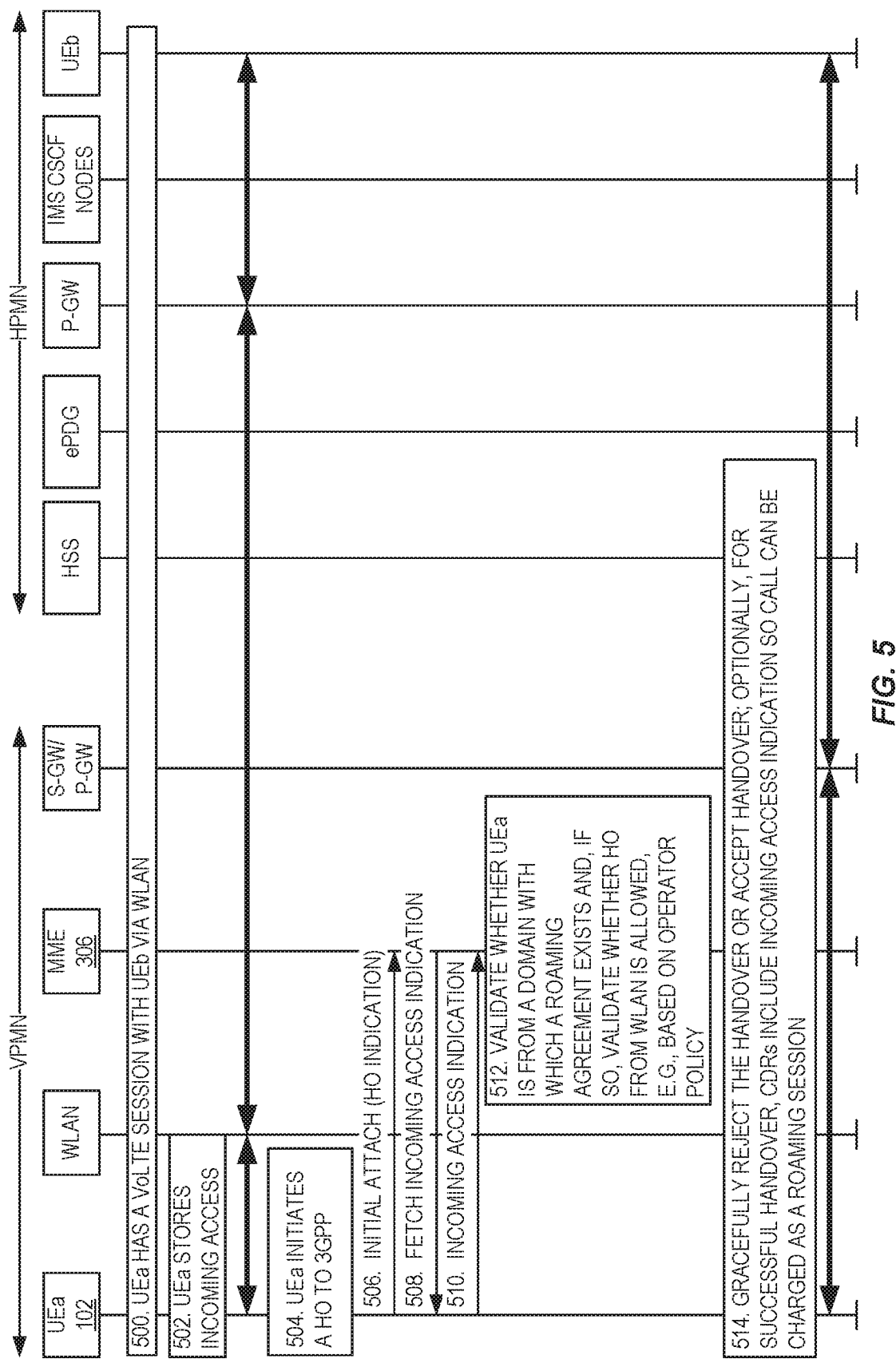
FIG. 5 illustrates one example implementation of at least some aspects of the second embodiment of the present disclosure in which a controlled handover of a UE is provided from an incoming access network (e.g., a WLAN) to a cellular radio access network (3GPP RAN) of a visited cellular network while the UE is in roaming.

FIG. 5 illustrates one example implementation of at least some aspects of the second embodiment of the present disclosure. Note that while this example uses EPC as the core network, the same principle applies to a 5GC, regardless of the handover target being a 5GC or EPC.

The steps illustrated in FIG. 5 are as follows.

In step 500, UEa while roaming attaches to a WLAN, establishes a VPN with the HPMN, then establishes a VoLTE session with UEb.

In step 502, UEa stores the current access information. This information includes information that indicates the network type of the current access network, which is WLAN in this example.

In step 504, UEa decides to handover the session to 3GPP access, which can be EPC or 5GC. In this example it is assumed EPC.

In step 506, UEa starts an initial attach for handover purposes by sending an initial attach request. In this embodiment, the initial attach request includes the HO indication but not the incoming access indication.

In step 508, the MME fetches, from UEa, (e.g., sends a request to UEa for) the incoming access information. In this example, the incoming access information is the incoming access indication. In one example embodiment, the exiting identity request is extended with this additional capability, but other options are also possible.

In step 510, UEa sends the incoming access information (e.g., the incoming access indication) to the MME. Note that, in order to maintain backward compatibility, if the UE returns incoming access information in step 510, then the HO indication in the initial attach request is interpreted as a handover of UEa from the incoming access indicated by the incoming access information; otherwise, if UEa does not return incoming access information in response to the fetch, then the HO indication is interpreted as an indication that the initial attach request is for a handover of UEa from WLAN to 3GPP access (i.e., the current meaning of the HO indication).

In step 512, the MME validates whether UEa is from a domain with which a roaming agreement exists. If a roaming agreement exists, the MME further validates whether handover from the incoming access network (type) is allowed, e.g., based on operator policy, i.e., if the handover from the incoming domain/access network is allowed. If handover is allowed, then, in this example, the MME makes a decision to allow the handover. Otherwise, the MME makes a decision to reject the handover.

Note that while in this example, the MME decides whether to allow or reject the handover based on the incoming access indication, the present disclosure is not limited thereto. The decision as to whether to allow or reject the handover may be made by any suitable entity in the VPMN. Further, whether the decision is made by the MME or some other entity in the VPMN, the decision is made based on the incoming access indication and, optionally, one or more additional criteria (e.g., APN) associated with the handover (e.g., the APN provided by UEa during PDN connection establishment during the handover, or whether the VPMN supports VoIMS).

In step 514, if the VPMN decides to reject the handover, the VPMN (e.g., the MME) rejects the handover gracefully, e.g., rejects the attachment with a special code that indicates that the rejection is due to a "bad" incoming access network (type), e.g., such that this failed attachment/handover is not included in the KPIs. If the VPMN decides to allow the handover, then the handover is completed, e.g., in the conventional manner. However, in some embodiments, if handover is allowed, the VPMN (e.g., the MME) includes the incoming access indication in generated CDRs so the session can be charged as a roaming session, given that it started as a non-roaming session over WLAN.

Note that while FIG. 5 illustrates one example of fetching the incoming access indication during attachment for the handover, the present disclosure is not limited thereto. In some other embodiments, the incoming access indication is fetched from UEa during a PDU session establishment for the handover.

In a third embodiment of the present disclosure, the HSS (or HSS/UDM) in the UE's HPMN stores information about the access network of the UE, e.g., together with the P-GW identity, and the HSS provides this information to the MME (or AMF) when the MME receives information on the PDNs that the UE is connected to over the non-3GPP access in the subscriber data obtained from the HSS.

Figure 6:
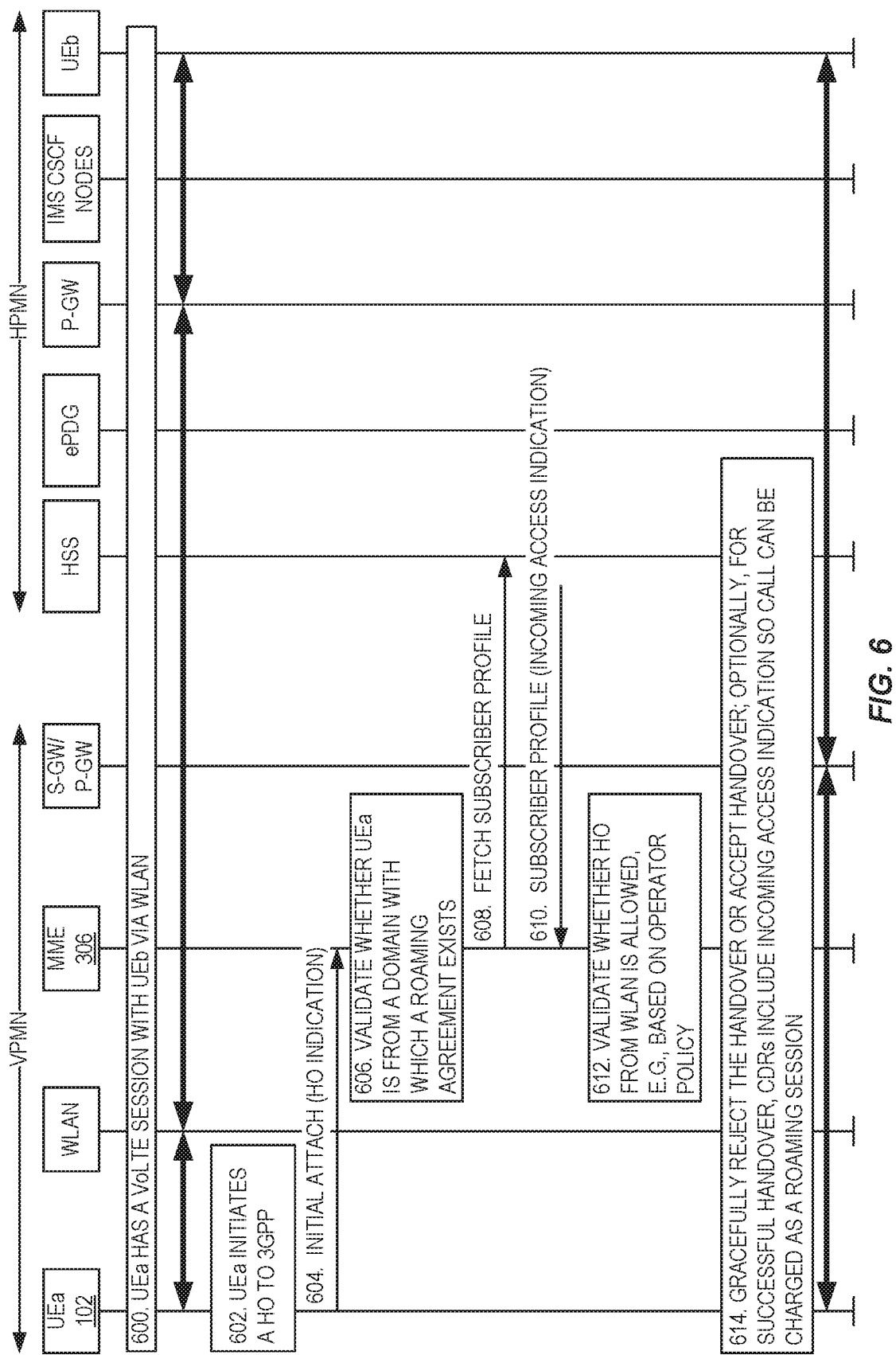
FIG. 6 illustrates one example implementation of at least some aspects of the third embodiment of the present disclosure in which a controlled handover of a UE is provided from an incoming access network (e.g., a WLAN) to a cellular radio access network (3GPP RAN) of a visited cellular network while the UE is in roaming.

FIG. 6 illustrates one example implementation of at least some aspects of the third embodiment of the present disclosure. Note that while this example uses EPC as the core network, the same principle applies to a 5GC, regardless of the handover target being a 5GC or EPC. In essence, the process of FIG. 6 is a normal attach with handover, the difference being that the incoming access network information (e.g., the incoming access indication) is returned with the subscriber profile. This option requires that there is a roaming agreement with the home domain.

In step 600, UEa while roaming attaches to a WLAN, establishes a VPN with the HPMN, then establishes a VoLTE session with UEb.

In step 602, UEa decides to handover the session to 3GPP access, which can be EPC or 5GC. In this example, it is assumed EPC.

In step 604, UEa starts an initial attach for handover purposes by sending an initial attach request. In this embodiment, the initial attach request includes a HO indication but not an incoming access indication.

In step 606, upon receiving the initial attach request from UEa, the MME validates whether UEa is from a domain with which a roaming agreement exists.

In step 608, if a roaming agreement exists, the MME fetches a subscriber profile of UEa from the HSS.

In step 610, the HSS returns the subscriber profile of UEa to the MME. In this embodiment, the subscriber profile includes the incoming access indication that indicates the incoming access network (type) for the handover.

Note that while steps 608 and 610 involve the HSS in the example of FIG. 6, the present disclosure is not limited thereto. This functionality may additionally or alternatively be performed at the PCRF or PCF.

In step 612, the MME further validates whether the handover from the particular (type of) access network indicated by the incoming access indication (which in this example is WLAN) is allowed, e.g., based on operator policy, i.e., if the handover from the incoming domain/access network is allowed. If handover is allowed, then, in this example, the MME makes a decision to allow the handover. Otherwise, the MME makes a decision to reject the handover.

Note that while in this example, the MME decides whether to allow or reject the handover based on the incoming access indication, the present disclosure is not limited thereto. The decision as to whether to allow or reject the handover may be made by any suitable entity in the VPMN. Further, whether the decision is made by the MME or some other entity in the VPMN, the decision is made based on the incoming access indication and, optionally, one or more additional criteria (e.g., APN) associated with the handover (e.g., the APN provided by UEa during PDN connection establishment during the handover, or whether the VPMN supports VoIMS).

In step 614, if the VPMN decides to reject the handover, the VPMN (e.g., the MME) rejects the handover gracefully, e.g., rejects the attachment with a special code that indicates that the rejection is due to a "bad" incoming access network (type), e.g., such that this failed attachment/handover is not included in the KPIs. If the VPMN decides to allow the handover, then the handover is completed, e.g., in the conventional manner. However, in some embodiments, if handover is allowed, the VPMN (e.g., the MME) includes the incoming access indication in generated CDRs so the session can be charged as a roaming session, given that it started as a non-roaming session over WLAN.

Note that while FIG. 6 illustrates one example of obtaining the incoming access indication from the HPMN during initial attach, the present disclosure is not limited thereto. In some other embodiments, the incoming access indication (e.g., and the HO indication) is obtained from the HPMN during PDU session establishment for the handover.

Lawful intercept is a desired function in wireless communication systems. In this regard, the discussion now turns to additional functionality added to any of the embodiments described above to deal with intercept for a UE engaged in a session that starts over WiFi with an ePDG at home (i.e., in the UE's home PLMN) and that can potentially be handed over to 3GPP access in the visited domain (i.e., in the VPMN). More specifically, in some embodiments, if the UE that established a WiFi session with an ePDG in the UE's HPMN is subject to lawful intercept, then the following can apply:

1. If the UE is intercepted in the UE's HPMN in either the P-GW or the IMS AGW, then nothing is required.
2. If the UE is intercepted in the ePDG, then the HPMN updates the UE configuration to configure the UE to disallow handover to 3GPP (since it is not possible to intercept the UE in the VPMN once the session is handed over to the VPMN). However, HPLM operator policies do apply here as well to control such a configuration. If the HPMN does not have any agreement with the VPMN operator to intercept inbound roamers to the VPMN, then the HPMN may allow handover and do nothing.

Importantly, it should be noted that the embodiments described here related to lawful intercept are described using a 4G system, i.e., EPC comprising an ePDG; however, the same embodiments apply to a 5G system comprising a 5GC network that includes the N3IWF which is equivalent to the ePDG in 4G.

Figure 7:
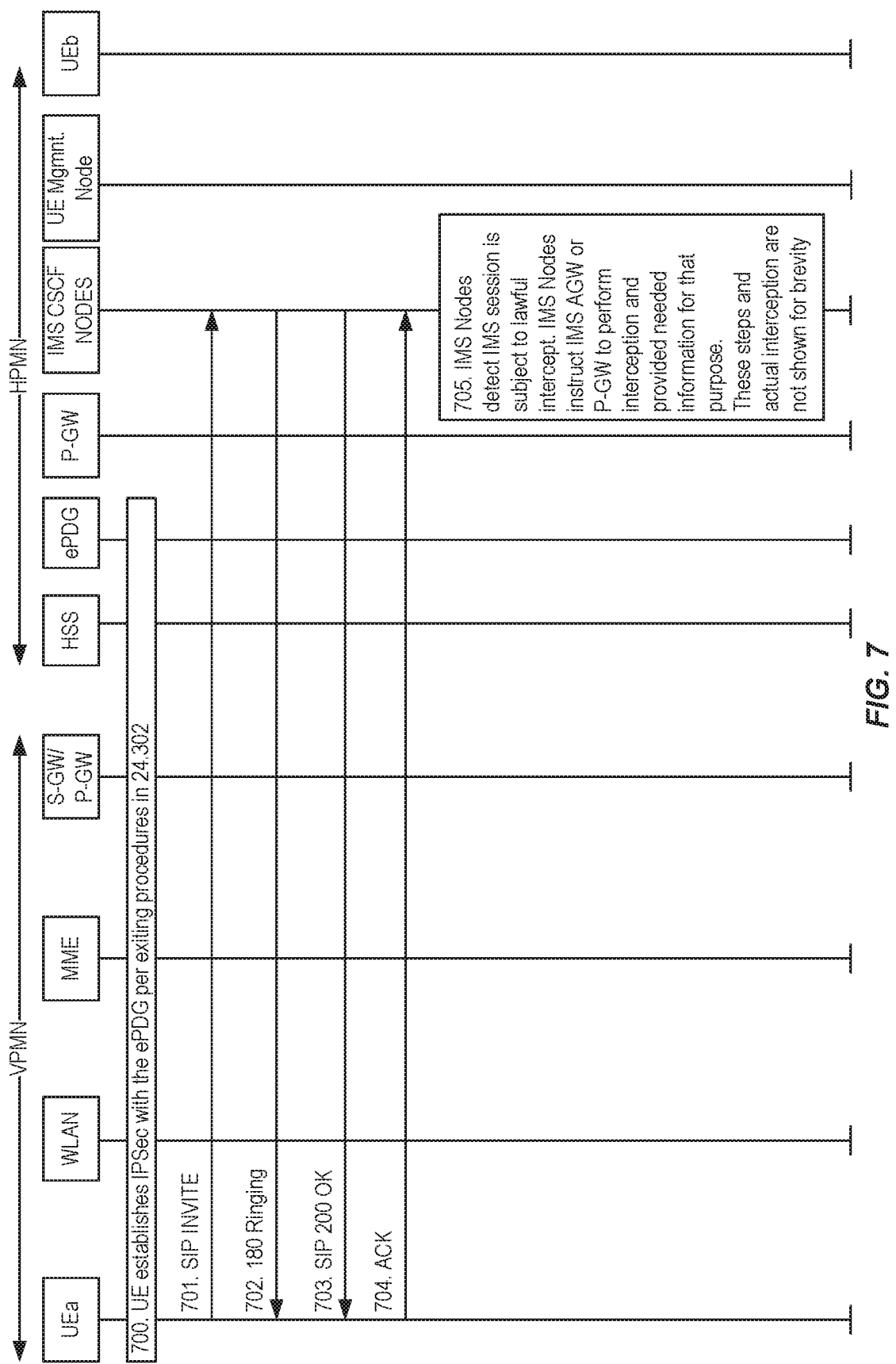
FIG. 7 illustrates the details of steps 400, 500, and 600 of FIGS. 4, 5, and 6, respectively, to provide this additional functionality in a scenario in which the UE is intercepted in the UE's Home Public Mobile Network (HPMN) in either the Packet Data Network (PDN) Gateway (P-GW) or the Internet Protocol (IP) Multimedia Subsystem (IMS) Access Gateway (AGW) in accordance with some other embodiments of the present disclosure.

Looking back at the embodiments of FIGS. 4, 5, and 6, the additional functionality to deal with lawful intercept can be included in steps 400, 500, and 600, respectively. FIG. 7 illustrates the details of steps 400, 500, and 600 to provide this additional functionality in scenario #1 described above (i.e., the scenario in which the UE is intercepted in the UE's HPMN in either the P-GW or the IMS AGW). As illustrated, UEa establishes IP Security (IPSec) with the ePDG per existing procedures (e.g., existing procedures in 3GPP TS 24.302) (step 700). UEa then sends a Session Initiation Protocol (SIP) INVITE to the IMS (e.g., to an IMS Call Session Control Function (CSCF) node) (step 701). A series of messages (i.e., 180 Ringing, SIP 200 OK, and Acknowledgement (ACK)) are then exchanged between UEa and the IMS CSCF nodes in the conventional manner (steps 702 through 704). At this point, an IMS session has been established. The IMS CSCF node(s) detects that the IMS session is subject to lawful intercept and instructs the P-GW or IMS AGW to perform interception and provide needed information for that purpose, e.g., in the conventional manner (step 705). In this case, since the UE is intercepted in the UE's HPMN in either the P-GW or the IMS AGW, then nothing additional is required.

Figure 8:
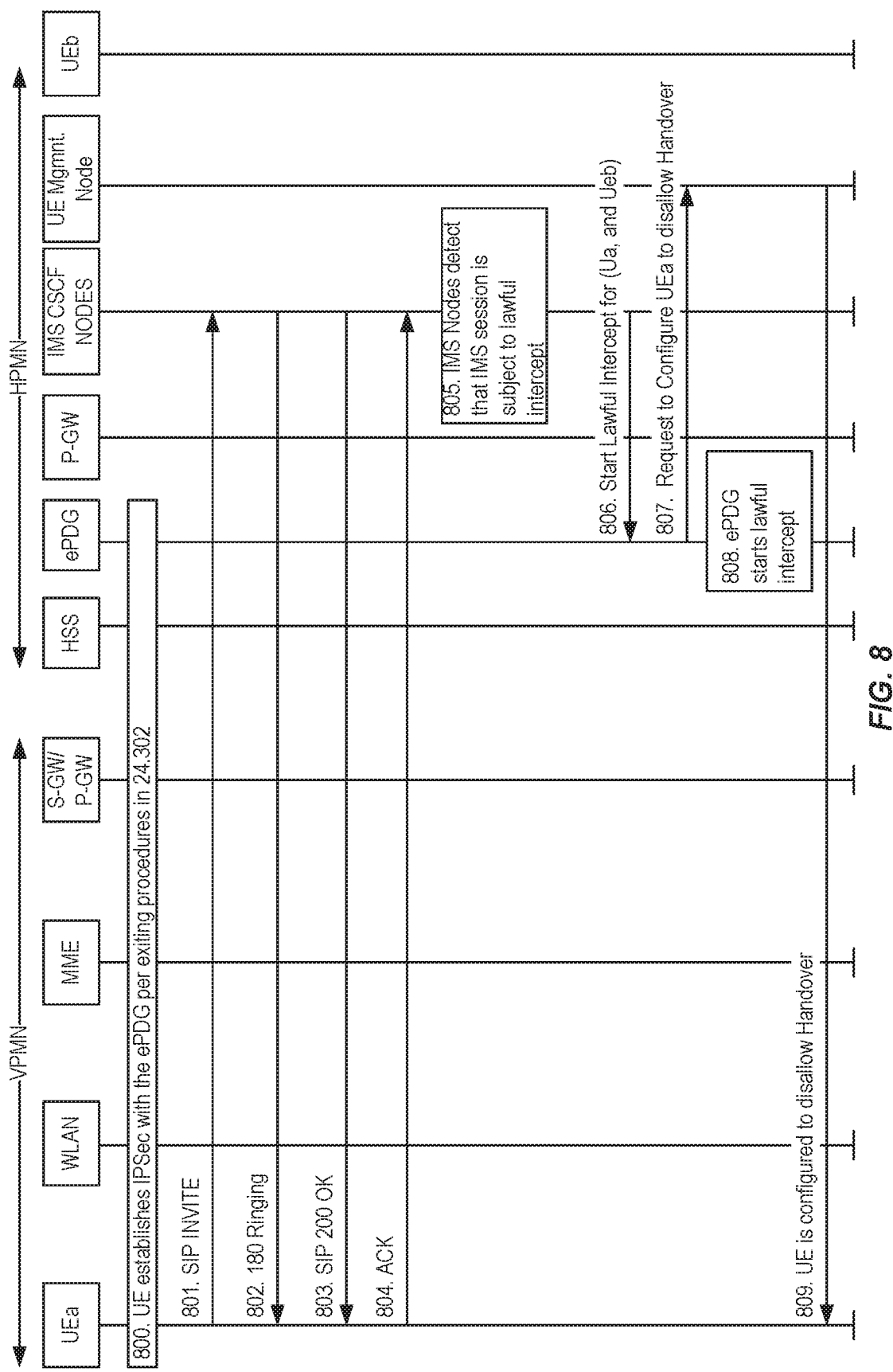
FIG. 8 illustrates the details of steps 400, 500, and 600 of FIGS. 4, 5, and 6, respectively, to provide this additional functionality in a scenario in which the UE is intercepted in the evolved Packet Data Gateway (ePDG) in accordance with some other embodiments of the present disclosure.

FIG. 8 illustrates the details of steps 400, 500, and 600 to provide this additional functionality in scenario #2 described above (i.e., the scenario in which the UE is intercepted in the UE's HPMN in the ePDG). As illustrated, UEa establishes IPSec with the ePDG per existing procedures (e.g., existing procedures in 3GPP TS 24.302) (step 800). UEa then sends an SIP INVITE to the IMS (e.g., to an IMS CSCF node) (step 801). A series of messages (i.e., 180 Ringing, SIP 200 OK, and ACK) are then exchanged between UEa and the IMS CSCF nodes in the conventional manner (steps 802 through 804). At this point, an IMS session has been established. The IMS CSCF node(s) detects that the IMS session is subject to lawful intercept in the ePDG (step 805). The IMS CSCF node(s) instructs the ePDG to start lawful interception for the session (step 806). The ePDG then sends a request to a UE management node to configure UEa to disallow handover to 3GPP from WLAN (step 807) and performs lawful intercept (step 808). The UE management node then configures UEa to disallow handover (step 809). Once handover is disallowed, the UEa will not allow the handover to 3GPP in the VPMN as described above with respect to steps 402-408 of FIG. 4, steps 504-514 of FIG. 5, and steps 602-614 of FIG. 6.

Figure 9:
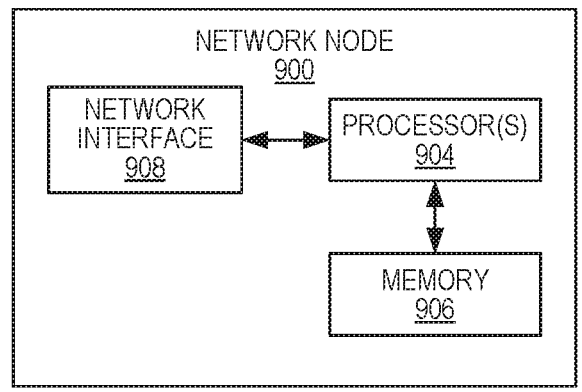
FIGS. 9 to 11 illustrate example embodiments of a network node (e.g., a core network node) in accordance with some embodiments of the present disclosure.

FIG. 9 is a schematic block diagram of a network node 900 according to some embodiments of the present disclosure. The network node 900 may be, for example, a core network node (e.g., a HSS, MME, etc.) or a network node implementing a core network function (e.g., an AMF, SMF, SCEF, etc.). As illustrated, the network node 900 includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. The one or more processors 904 operate to provide one or more functions of a network node 900 as described herein. In some embodiments, the function(s) are implemented in software that is stored, e.g., in the memory 906 and executed by the one or more processors 904.

Figure 10:
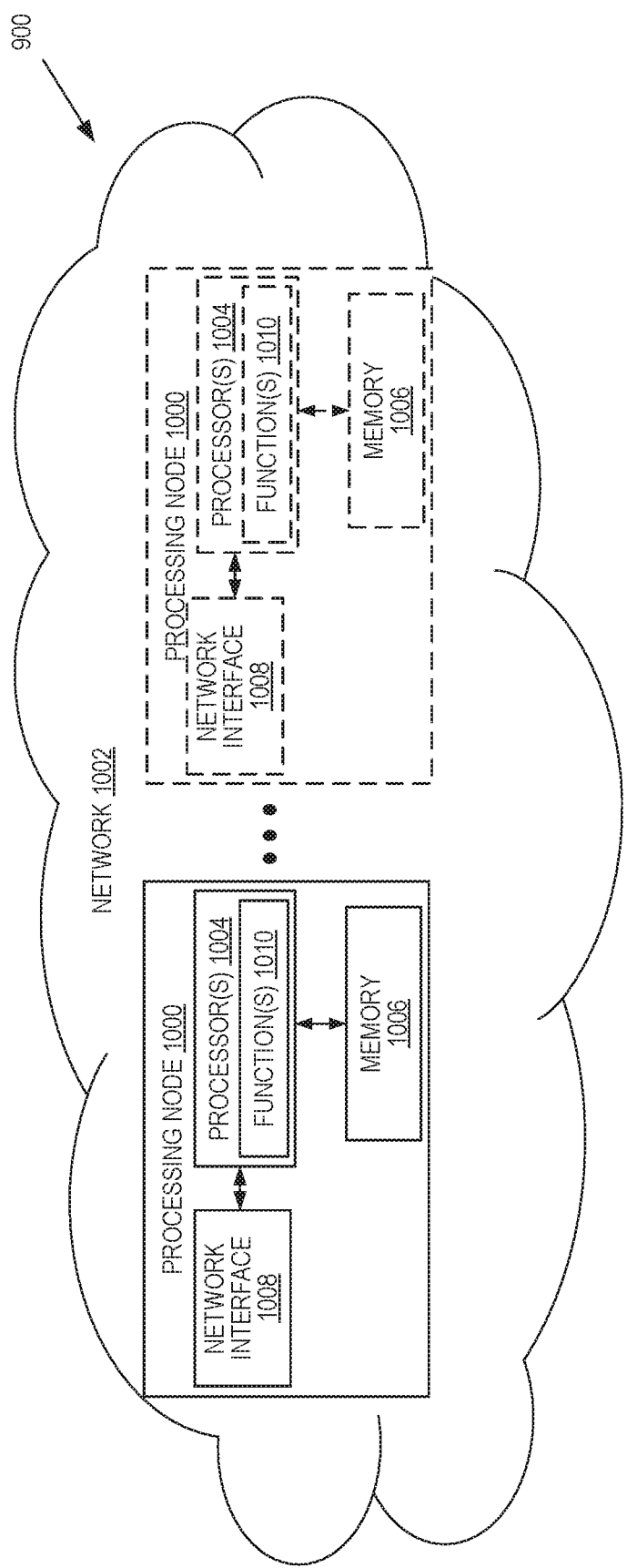

FIG. 10 is a schematic block diagram that illustrates a virtualized embodiment of the network node 900 according to some embodiments of the present disclosure. This discussion is equally applicable to other types of network nodes. Further, other types of network nodes may have similar virtualized architectures.

As used herein, a "virtualized" network node is an implementation of the network node 900 in which at least a portion of the functionality of the network node 900 is implemented as a virtual component(s) (e.g., via a virtual machine(s) executing on a physical processing node(s) in a network(s)). As illustrated, in this example, the network node 900 includes one or more processing nodes 1000 coupled to or included as part of a network(s) 1002. Each processing node 1000 includes one or more processors 1004 (e.g., CPUs, ASICs, FPGAs, and/or the like), memory 1006, and a network interface 1008. In this example, functions 1010 of the network node 900 described herein are implemented at the one or more processing nodes 1000 or distributed across two or more processing nodes 1000 in any desired manner. In some particular embodiments, some or all of the functions 1010 of the network node 900 described herein are implemented as virtual components executed by one or more virtual machines implemented in a virtual environment(s) hosted by the processing node(s) 1000.

In some embodiments, a computer program including instructions which, when executed by at least one processor, causes the at least one processor to carry out the functionality of network node 900 or a node according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
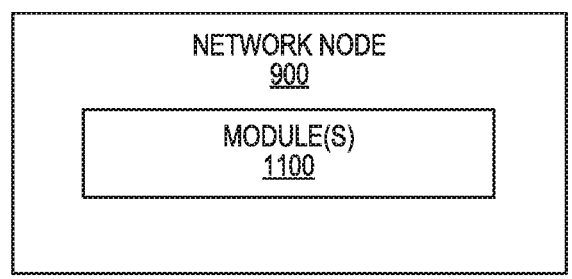

FIG. 11 is a schematic block diagram of the network node 900 according to some other embodiments of the present disclosure. The network 900 includes one or more modules 1100, each of which is implemented in software. The module(s) 1100 provide the functionality of the network node 900 described herein. This discussion is equally applicable to the processing node 1000 of FIG. 10 where the modules 1100 may be implemented at one of the processing nodes 1000 or distributed across multiple processing nodes 1000.

Figure 12:
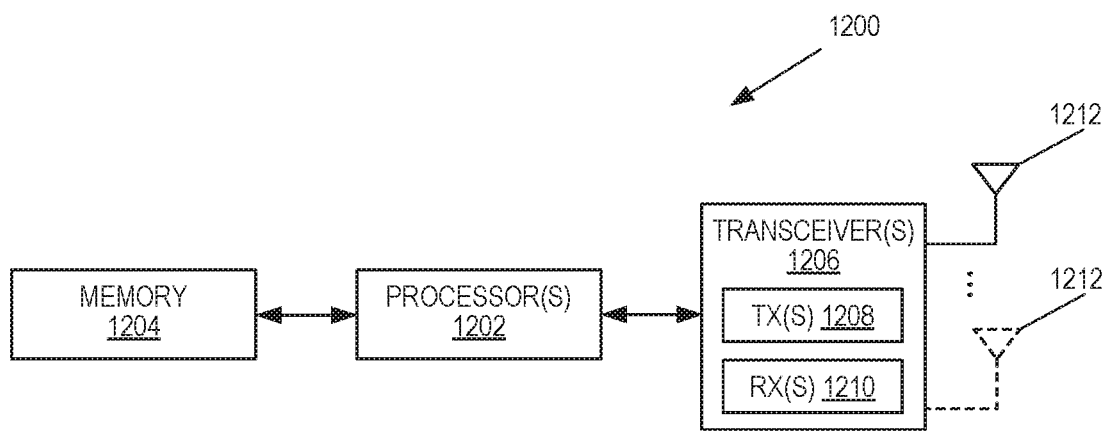
FIGS. 12 and 13 illustrate example embodiments of a UE.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry. In some embodiments, the functionality of the UE 1200 described above may be fully or partially implemented in software that is, e.g., stored in the memory 1204 and executed by the processor(s) 1202. Note that the UE 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the UE 1200 and/or allowing output of information from the UE 1200), a power supply (e.g., a battery and associated power circuitry), etc.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
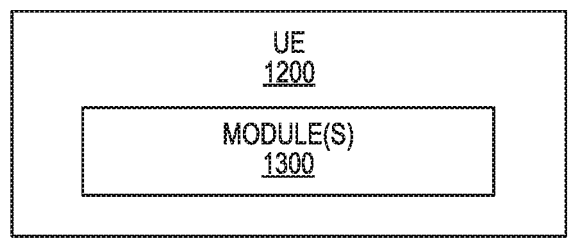

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example (and non-limiting) embodiments of the present disclosure are as follows:

Embodiment 1: A method performed by a wireless device to perform handover from an incoming access network to a cellular access network of a visited cellular network while in roaming, the method comprising sending a message to a core network of a visited cellular network, wherein the message is related to a handover of the wireless device from an incoming access network to a cellular access network of the visited cellular network and the message comprises an incoming access indication wherein the incoming access indication is an indication of the incoming access network from which the handover of the wireless device is desired.

Embodiment 2: The method of embodiment 1 wherein the message is a NAS message (e.g., an initial attach request, e.g., in which a PDN connection request is embedded within the initial attach request), and the NAS message comprises the incoming access indication (e.g., the incoming access indication is included in the PDN connection request embedded within the initial attach request).

Embodiment 3: The method of embodiment 1 wherein the message is a NAS message (e.g., an initial attach request, e.g., in which a PDN connection request is embedded within the initial attach request), and the NAS message comprises the incoming access indication and a handover indication (e.g., the handover indication and the incoming access indication are included in the PDN connection request embedded within the initial attach request), the handover indication being an indication that the initial attach request is for a handover from a non-cellular access network (e.g., a non-3GPP radio access network).

Embodiment 4: The method of embodiment 1 wherein the message is a PDU session establishment request.

Embodiment 5: The method of any one of embodiments 1 to 4 wherein the incoming access indication is an indication of a network type of the incoming access network.

Embodiment 6: The method of any one of embodiments 1 to 5 wherein the incoming access network is a WLAN access network.

Embodiment 7: The method of any one of embodiments 1 to 6 further comprising receiving a second message indicating handover failure based on the access network type of the incoming access network.

Embodiment 8: A method performed by a wireless device to perform handover from an incoming access network to a cellular access network of a visited cellular network while in roaming, the method comprising: sending a request to a core network of a visited cellular network, the request being related to a handover of the wireless device from an incoming access network to a cellular access network of the visited cellular network; receiving, from the core network of the visited cellular network, a request for information regarding the incoming access network; and, upon receiving the request, sending, to the core network of the visited cellular network, a message comprising an incoming access indication wherein the incoming access indication is an indication of the incoming access network from which the handover of the wireless device is desired.

Embodiment 9: The method of embodiment 8 wherein the request sent to the core network of the visited cellular network is a NAS message (e.g., an initial attach request).

Embodiment 10: The method of embodiment 9 wherein the NAS message comprises a handover indication (e.g., the handover indication being in a PDN connection request embedded within the initial attach request), the handover indication being an indication that the initial attach request is for a handover from a non-cellular access network.

Embodiment 11: The method of embodiment 8 wherein the message is a PDU session establishment request.

Embodiment 12: The method of any one of embodiments 8 to 11 wherein the incoming access indication is an indication of a network type of the incoming access network.

Embodiment 13: The method of any one of embodiments 8 to 12 wherein the incoming access network is a WLAN access network.

Embodiment 14: The method of any one of embodiments 8 to 13 further comprising receiving a second message indicating handover failure based on the access network type of the incoming access network.

Embodiment 15: A wireless device for performing a handover from an incoming access network to a cellular access network of a visited cellular network while in roaming, the wireless device adapted to perform the method of any one of embodiments 1 to 14.

Embodiment 16: A wireless device for performing a handover from an incoming access network to a cellular access network of a visited cellular network while in roaming, the wireless device comprising a radio interface and processing circuitry operable to cause the wireless device to perform the method of any one of embodiments 1 to 14.

Embodiment 17: A method performed by a core network node in a visited cellular network of a wireless device to accept or reject handover of the wireless device from an incoming access network to a cellular access network of the visited cellular network while the wireless device is in roaming, the method comprising:
receiving a message, wherein:
the message is related to a handover of a wireless device from an incoming access network to a cellular access network of the visited cellular network; and
the message comprises an incoming access indication wherein the incoming access indication is an indication of the incoming access network from which the handover of the wireless device is desired; and
making a decision as to whether to accept or reject the handover based on the incoming access indication.

Embodiment 18: The method of embodiment 17 wherein the message is a NAS message (e.g., an initial attach request, e.g., in which a PDN connection request is embedded within the initial attach request), and the NAS message comprises the incoming access indication (e.g., the incoming access indication is included in the PDN connection request embedded within the initial attach request).

Embodiment 19: The method of embodiment 17 wherein the message is a NAS message (e.g., an initial attach request, e.g., in which a PDN connection request is embedded within the initial attach request), and the NAS message comprises the incoming access indication and a handover indication (e.g., the handover indication and the incoming access indication are included in the PDN connection request embedded within the initial attach request), the handover indication being an indication that the initial attach request is for a handover from a non-cellular access network (e.g., a non-3GPP radio access network).

Embodiment 20: The method of embodiment 17 wherein the message is a PDU session establishment request from the wireless device.

Embodiment 21: The method of any one of embodiments 17 to 20 wherein the incoming access indication is an indication of a network type of the incoming access network.

Embodiment 22: The method of any one of embodiments 17 to 21 wherein the incoming access network is a WLAN access network.

Embodiment 23: The method of any one of embodiments 17 to 22 wherein making the decision as to whether to accept or reject the handover based on the incoming access indication comprises deciding to accept the handover based on the incoming access information and, upon successful handover, storing the incoming access indication in one or more associated charging data records.

Embodiment 24: The method of any one of embodiments 17 to 22 wherein making the decision as to whether to accept or reject the handover based on the incoming access indication comprises deciding to reject the handover based on the incoming access information and, upon deciding to reject the handover, rejecting the handover using a code that indicates that the handover failed due to a non-allowed incoming access network.

Embodiment 25: The method of any one of embodiments 17 to 22 wherein making the decision as to whether to accept or reject the handover based on the incoming access indication comprises making the decision as to whether to accept or reject the handover based on the incoming access indication and one or more additional criteria.

Embodiment 26: The method of embodiment 25 wherein the one or more additional criteria comprise an indication of one of a PDN or a service the wireless device is requesting access.

Embodiment 27: The method of embodiment 26 wherein the indication comprises an APN associated with the handover.

Embodiment 28: A method performed by a core network node in a visited cellular network of a wireless device to accept or reject handover of the wireless device from an incoming access network to a cellular access network of the visited cellular network while the wireless device is in roaming, the method comprising: receiving a request from a wireless device, the request being related to a handover of the wireless device from an incoming access network to a cellular access network of the visited cellular network; sending, to the wireless device, a request for information regarding the incoming access network; receiving, from the wireless device, a message comprising an incoming access indication wherein the incoming access indication is an indication of the incoming access network from which the handover of the wireless device is desired; and making a decision as to whether to accept or reject the handover based on the incoming access indication.

Embodiment 29: The method of embodiment 28 wherein the request received from the wireless device is a NAS message (e.g., an initial attach request).

Embodiment 30: The method of embodiment 29 wherein the NAS message comprises a handover indication (e.g., the handover indication being in a PDN connection request embedded within the initial attach request), the handover indication being an indication that the initial attach request is for a handover from a non-cellular access network.

Embodiment 31: The method of embodiment 28 wherein the message is a PDU session establishment request from the wireless device.

Embodiment 32: The method of any one of embodiments 28 to 31 wherein the incoming access indication is an indication of a network type of the incoming access network.

Embodiment 33: The method of any one of embodiments 28 to 32 wherein the incoming access network is a WLAN access network.

Embodiment 34: The method of any one of embodiments 28 to 33 wherein: making the decision as to whether to accept or reject the handover based on the incoming access indication comprises deciding to accept the handover based on the incoming access information; and, upon successful handover, storing the incoming access indication in one or more associated charging data records.

Embodiment 35: The method of any one of embodiments 28 to 33 wherein: making the decision as to whether to accept or reject the handover based on the incoming access indication comprises deciding to reject the handover based on the incoming access information; and, upon deciding to reject the handover, rejecting the handover using a code that indicates that the handover failed due to a non-allowed incoming access network.

Embodiment 36: The method of any one of embodiments 28 to 33 wherein making the decision as to whether to accept or reject the handover based on the incoming access indication comprises making the decision as to whether to accept or reject the handover based on the incoming access indication and one or more additional criteria.

Embodiment 37: The method of embodiment 36 wherein the one or more additional criteria comprise an indication of one of a PDN or a service the wireless device is requesting access.

Embodiment 38: The method of embodiment 37 wherein the indication comprises an APN associated with the handover.

Embodiment 39: A method performed by a core network node in a visited cellular network of a wireless device to accept or reject handover of the wireless device from an incoming access network to a cellular access network of the visited cellular network while the wireless device is in roaming, the method comprising: receiving a request from a wireless device, the request being related to a handover of the wireless device from an incoming access network to a cellular access network of the visited cellular network; sending, to a home cellular network of the wireless device, a request for information regarding the wireless device; receiving, from the home cellular network of the wireless device, a message comprising an incoming access indication wherein the incoming access indication is an indication of the incoming access network from which the handover of the wireless device is desired; and making a decision as to whether to accept or reject the handover based on the incoming access indication.

Embodiment 40: The method of embodiment 39 wherein the request received from the wireless device is a NAS message (e.g., an initial attach request).

Embodiment 41: The method of embodiment 40 wherein the NAS message comprises a handover indication (e.g., the handover indication being in a PDN connection request embedded within the initial attach request), the handover indication being an indication that the initial attach request is for a handover from a non-cellular access network.

Embodiment 42: The method of embodiment 39 wherein the message is a PDU session establishment request from the wireless device.

Embodiment 43: The method of any one of embodiments 39 to 42 wherein the incoming access indication is an indication of a network type of the incoming access network.

Embodiment 44: The method of any one of embodiments 39 to 43 wherein the incoming access network is a WLAN access network.

Embodiment 45: The method of any one of embodiments 39 to 44 wherein: making the decision as to whether to accept or reject the handover based on the incoming access indication comprises deciding to accept the handover based on the incoming access information; and, upon successful handover, storing the incoming access indication in one or more associated charging data records.

Embodiment 46: The method of any one of embodiments 39 to 44 wherein: making the decision as to whether to accept or reject the handover based on the incoming access indication comprises deciding to reject the handover based on the incoming access information; and, upon deciding to reject the handover, rejecting the handover using a code that indicates that the handover failed due to a non-allowed incoming access network.

Embodiment 47: The method of any one of embodiments 39 to 44 wherein making the decision as to whether to accept or reject the handover based on the incoming access indication comprises making the decision as to whether to accept or reject the handover based on the incoming access indication and one or more additional criteria.

Embodiment 48: The method of embodiment 43 wherein the one or more additional criteria comprise an indication of one of a PDN or a service the wireless device is requesting access.

Embodiment 49: The method of embodiment 48 wherein the indication comprises an APN associated with the handover.

Embodiment 50: The method of any one of embodiments 39 to 49 wherein the request for information is a request for a subscriber profile of the wireless device.

Embodiment 51: A core network node for a visited cellular network of a wireless device for accepting or rejecting handover of the wireless device from an incoming access network to a cellular access network of the visited cellular network while the wireless device is in roaming, the core network node adapted to perform the method of any one of embodiments 17 to 50.

Embodiment 52: A core network node for a visited cellular network of a wireless device for accepting or rejecting handover of the wireless device from an incoming access network to a cellular access network of the visited cellular network while the wireless device is in roaming, the core network node comprising processing circuitry operable to case the core network node to perform the method of any one of embodiments 17 to 50.

Embodiment 53: A method performed by a network node in a home cellular network of a wireless device to provide information during handover of the wireless device from an incoming access network to a cellular access network of a visited cellular network of the wireless device while the wireless device is in roaming, the method comprising: receiving, from the visited cellular network of the wireless device, a request for information regarding the wireless device; and sending, to the visited cellular network of the wireless device, a message comprising an incoming access indication wherein the incoming access indication is an indication of the incoming access network from which the handover of the wireless device is desired.

Embodiment 54: A network node for a home cellular network of a wireless device for providing information during handover of the wireless device from an incoming access network to a cellular access network of a visited cellular network of the wireless device while the wireless device is in roaming, the network node adapted to: receive, from the visited cellular network of the wireless device, a request for information regarding the wireless device; and send, to the visited cellular network of the wireless device, a message comprising an incoming access indication wherein the incoming access indication is an indication of the incoming access network from which the handover of the wireless device is desired.

Embodiment 55: A network node for a home cellular network of a wireless device for providing information during handover of the wireless device from an incoming access network to a cellular access network of a visited cellular network of the wireless device while the wireless device is in roaming, the network node comprising processing circuitry operable to cause the network node to: receive, from the visited cellular network of the wireless device, a request for information regarding the wireless device; and send, to the visited cellular network of the wireless device, a message comprising an incoming access indication wherein the incoming access indication is an indication of the incoming access network from which the handover of the wireless device is desired.

Embodiment 56: A method performed by an ePDG/N3IWF to disallow handover of a wireless device from an incoming access network to a cellular access network of a visited cellular network while in roaming when the wireless device is subject to lawful intercept, the method comprising: receiving (806) an instruction to perform lawful intercept for the wireless device; and sending (808), to a management node, a request to configure the wireless device to disallow handover from the incoming access network to the cellular access network of the visited cellular network.

Embodiment 57: The method of embodiment 56 wherein the incoming access network is a WLAN access network.

Embodiment 58: A method performed by a management node to disallow handover of a wireless device from an incoming access network to a cellular access network of a visited cellular network while in roaming when the wireless device is subject to lawful intercept, the method comprising: receiving (808), from another node, a request to configure the wireless device to disallow handover from the incoming access network to the cellular access network of the visited cellular network; and configuring (808) the wireless device to disallow handover from the incoming access network to the cellular access network of the visited cellular network.

Embodiment 59: The method of embodiment 58 wherein the other node is an ePDG/N3IWF.

Embodiment 60: The method of embodiment 58 or 59 wherein the incoming access network is a WLAN access network.

Embodiment 61: A ePDG/N3IWF for disallowing handover of a wireless device from an incoming access network to a cellular access network of a visited cellular network while in roaming when the wireless device is subject to lawful intercept, the ePDG/N3IWF adapted to: receive an instruction to perform lawful intercept for the wireless device; and send, to a management node, a request to configure the wireless device to disallow handover from the incoming access network to the cellular access network of the visited cellular network.

Embodiment 62: The ePDG/N3IWF of embodiment 61 wherein the incoming access network is a WLAN access network.

Embodiment 63: A management node for disallowing handover of a wireless device from an incoming access network to a cellular access network of a visited cellular network while in roaming when the wireless device is subject to lawful intercept, the management node adapted to: receive, from another node, a request to configure the wireless device to disallow handover from the incoming access network to the cellular access network of the visited cellular network; and configure the wireless device to disallow handover from the incoming access network to the cellular access network of the visited cellular network.

Embodiment 64: The management node of embodiment 63 wherein the other node is a ePDG/N3IWF.

Embodiment 65: The management node of embodiment 63 or 64 wherein the incoming access network is a WLAN access network.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
5GC Fifth Generation Core
ACK Acknowledgement
AF Application Function
AGW Access Gateway
AMF Access and Mobility Function
AN Access Network
APN Access Point Name
ASIC Application Specific Integrated Circuit
ATCF Access Transfer Control Function
AUSF Authentication Server Function
CDR Charging Data Record
CPU Central Processing Unit
CSCF Call Session Control Function
DSP Digital Signal Processor
eNB Enhanced or Evolved Node B
EPC Evolved Packet Core
ePDG Evolved Packet Data Gateway
FPGA Field Programmable Gate Array
gNB New Radio Base Station
HO Handover
HPMN Home Public Mobile Network
HSS Home Subscriber Server
I-CSCF Interrogating Call Session Control Function
IMS Internet Protocol Multimedia Subsystem
IP Internet Protocol
IPSec Internet Protocol Security
KPI Key Performance Indicator
LTE Long Term Evolution
MME Mobility Management Entity
MTC Machine Type Communication
N3GPP Non-Third Generation Partnership Project
N3IWF Non-Third Generation Partnership Project Inter-Working Function
NAS Non-Access Stratum
NEF Network Exposure Function
NF Network Function
NR New Radio
NRF Network Repository Function
NSSF Network Slice Selection Function
PCF Policy Control Function
PCRF Policy and Charging Rules Function
P-CSCF Proxy Call Session Control Function
PDN Packet Data Network
PDU Protocol Data Unit
P-GW Packet Data Network Gateway
QoS Quality of Service
RAM Random Access Memory
RAN Radio Access Network
ROM Read Only Memory
RTT Round Trip Time
SCEF Service Capability Exposure Function
S-CSCF Serving Call Session Control Function
S-GW Serving Gateway
SIP Session Initiation Protocol
SMF Session Management Function
TS Technical Specification
UDM Unified Data Management
UE User Equipment
UPF User Plane Function
VoIMS Voice over Internet Protocol Multimedia Subsystem
VoLTE Voice over Long Term Evolution
VoWiFi Voice over WiFi
VPMN Visited Public Mobile Network
VPN Virtual Private Network
WLAN Wireless Local Area Network Those skilled in the art will recognize improvements and modifications to the embodiments of the present disclosure. All such improvements and modifications are considered within the scope of the concepts disclosed herein.

What is claimed is:

1. A method for handover of a wireless device from an incoming access network to a cellular access network of a visited cellular network while in roaming, the method comprising:
    at the wireless device:
        sending a message to the visited cellular network, wherein:
            the message is related to a handover of the wireless device from the incoming access network to the cellular access network of the visited cellular network; and
            the message comprises an incoming access indication, wherein the incoming access indication is an indication of the incoming access network from which the handover of the wireless device is desired; and
    at a core network node:
        receiving the message;
        making a decision as to whether to accept or reject the handover based on the incoming access indication, wherein making the decision as to whether to accept or reject the handover based on the incoming access indication comprises deciding to reject the handover based on the incoming access information;
        upon deciding to reject the handover, rejecting the handover using a code that indicates that the handover failed due to a non-allowed incoming access network; and
        sending a message to the wireless device that indicates that the handover is rejected, the message comprising the code that indicates that the handover failed due to a non-allowed incoming access network.

2. A method performed by a wireless device to perform a handover from an incoming access network to a cellular access network of a visited cellular network while in roaming, the method comprising:
    sending a message to the visited cellular network, wherein:
        the message is related to a handover of the wireless device from the incoming access network to the cellular access network of the visited cellular network; and
        the message comprises an incoming access indication wherein the incoming access indication is an indication of the incoming access network from which the handover of the wireless device is desired; and
    receiving, from the visited cellular network, a second message indicating handover failure, the second message comprising a code that indicates that the handover failed due to a non-allowed incoming access network.

3. The method of claim 2 wherein the message is a Non-Access Stratum, NAS, message, and the NAS message comprises the incoming access indication and a handover indication, the handover indication being an indication that an initial attach request is for a handover from a non-cellular access network.

4. The method of claim 2 wherein the message is a Non-Access Stratum, NAS, message, and the NAS message comprises the incoming access indication.

5. The method of claim 4 wherein the NAS message is an initial attach request.

6. The method of claim 5 wherein a Packet Data Network, PDN, connection request is embedded within the initial attach request, and the incoming access indication is included in the PDN connection request embedded within the initial attach request.

7. The method of claim 2 wherein the message is a Protocol Data Unit, PDU, session establishment request.

8. The method of claim 2 wherein the incoming access indication is an indication of a network type of the incoming access network.

9. The method of claim 2 wherein the incoming access network is a non-cellular access network.

10. The method of claim 2 wherein the incoming access network is a Wireless Local Area Network, WLAN, access network.

11. A wireless device for performing a handover from an incoming access network to a cellular access network of a visited cellular network while in roaming, the wireless device comprising:
a radio interface; and
processing circuitry operable to cause the wireless device to:
send a message to the visited cellular network, wherein:
the message is related to a handover of the wireless device from the incoming access network to the cellular access network of the visited cellular network; and
the message comprises an incoming access indication, wherein the incoming access indication is an indication of the incoming access network from which the handover of the wireless device is desired; and
receive, from the visited cellular network, a second message indicating handover failure, the second message comprising a code that indicates that the handover failed due to a non-allowed incoming access network.

12. A method performed by a core network node in a visited cellular network of a wireless device to accept or reject handover of the wireless device from an incoming access network to a cellular access network of the visited cellular network while the wireless device is in roaming, the method comprising:
receiving a message that is related to a handover of a wireless device from the incoming access network to the cellular access network of the visited cellular network, wherein the message comprises an incoming access indication, wherein the incoming access indication is an indication of the incoming access network from which the handover of the wireless device is desired;
making a decision as to whether to accept or reject the handover based on the incoming access indication, wherein making the decision as to whether to accept or reject the handover based on the incoming access indication comprises deciding to reject the handover based on the incoming access information;
upon deciding to reject the handover, rejecting the handover using a code that indicates that the handover failed due to a non-allowed incoming access network; and
sending a message to the wireless device that indicates that the handover is rejected, the message comprising the code that indicates that the handover failed due to a non-allowed incoming access network.

13. The method of claim 12 wherein the message is a Non-Access Stratum, NAS, message, and the NAS message comprises the incoming access indication and a handover indication, the handover indication being an indication that an initial attach request is for a handover from a non-cellular access network.

14. The method of claim 12 wherein the message is a Non-Access Stratum, NAS, message, and the NAS message comprises the incoming access indication.

15. The method of claim 14 wherein the NAS message is an initial attach request.

16. The method of claim 15 wherein a Packet Data Network, PDN, connection request is embedded within the initial attach request, and the incoming access indication is included in the PDN connection request embedded within the initial attach request.

17. The method of claim 12 wherein the message is a Protocol Data Unit, PDU, session establishment request from the wireless device.

18. The method of claim 12 wherein the incoming access indication is an indication of a network type of the incoming access network.

19. The method of claim 12 wherein the incoming access network is a non-cellular access network.

20. The method of claim 12 wherein the incoming access network is a Wireless Local Area Network, WLAN, access network.

21. The method of claim 12 wherein making the decision as to whether to accept or reject the handover based on the incoming access indication comprises making the decision as to whether to accept or reject the handover based on the incoming access indication and one or more additional criteria.

22. The method of claim 21 wherein the one or more additional criteria comprise an indication of one of a Packet Data Network, PDN, or a service for which the wireless device is requesting access.

23. The method of claim 22 wherein the indication comprises an Access Point Name, APN, associated with the handover.

24. A core network node for a visited cellular network of a wireless device for accepting or rejecting a handover of the wireless device from an incoming access network to a cellular access network of the visited cellular network while the wireless device is in roaming, the core network node comprising processing circuitry operable to cause the core network node to:
receive a message that is related to a handover of a wireless device from an incoming access network to a cellular access network of the visited cellular network, wherein the message comprises an incoming access indication wherein the incoming access indication is an indication of the incoming access network from which the handover of the wireless device is desired;
make a decision as to whether to accept or reject the handover based on the incoming access indication, wherein make a decision as to whether to accept or reject the handover based on the incoming access indication comprises deciding to reject the handover based on the incoming access information;

upon deciding to reject the handover, reject the handover using a code that indicates that the handover failed due to a non-allowed incoming access network; and send a message to the wireless device that indicates that the handover is rejected, the message comprising the code that indicates that the handover failed due to a non-allowed incoming access network.

\* \* \* \* \*